(12) United States Patent
Georgievskaya et al.

(10) Patent No.: US 12,039,768 B2
(45) Date of Patent: Jul. 16, 2024

(54) METHOD AND SYSTEM FOR ANONYMIZING FACIAL IMAGES

(71) Applicant: HautAI OU Private Limited Company, Tallinn (EE)

(72) Inventors: Anastasia Georgievskaya, Tallinn (EE); Timur Tlyachev, Tallinn (EE); Arseniy Golodyayev, Tallinn (EE); Roman Kiryanov, Tallinn (EE); Konstantin Kiselev, Tallinn (EE)

(73) Assignee: HautAI OU Private Limited Company, Kesklinna Linnaosa (EE)

( * ) Notice: Subject to any disclaimer, the term of this patent is extended or adjusted under 35 U.S.C. 154(b) by 205 days.

(21) Appl. No.: 17/477,397

(22) Filed: Sep. 16, 2021

(65) Prior Publication Data

US 2022/0335252 A1    Oct. 20, 2022

(30) Foreign Application Priority Data

Apr. 14, 2021    (EP) .................................... 21168284

(51) Int. Cl.
| | |
|---|---|
| *G06V 10/46* | (2022.01) |
| *G06N 3/088* | (2023.01) |
| *G06T 3/4046* | (2024.01) |
| *G06T 9/00* | (2006.01) |
| *G06V 10/141* | (2022.01) |
| *G06V 10/22* | (2022.01) |
| *G06V 40/16* | (2022.01) |

(52) U.S. Cl.
CPC ........... *G06V 10/462* (2022.01); *G06N 3/088* (2013.01); *G06T 3/4046* (2013.01); *G06T 9/002* (2013.01); *G06V 10/141* (2022.01); *G06V 10/22* (2022.01); *G06V 40/161* (2022.01)

(58) Field of Classification Search
CPC .. G06V 10/462; G06V 10/141; G06V 40/161; G06V 10/22; G06N 3/088; G06T 3/4046; G06T 9/002
See application file for complete search history.

(56) References Cited

U.S. PATENT DOCUMENTS

2009/0196475 A1 * 8/2009 Demirli ................ G06V 40/162
382/128

OTHER PUBLICATIONS

Lee, "Privacy-Protection Drone Patrol System based on Face Anonymization" arXiv May 2020 (Year: 2020).*
Zhu, Face Alignment Across Large Poses: A 3D Solution, CVPR 2016 (Year: 2016).*
Romdhani "Estimating 3D Shape and Texture Using Pixel Intensity, Edges, Specular Highlights, Texture Constraints and a Prior" 2005 (Year: 2005).*

(Continued)

*Primary Examiner* — Mark Roz (57) ABSTRACT

A computer-implemented method for anonymizing a facial image includes detecting one or more sets of facial keypoints in the facial image. The method further includes standardizing the facial image. The method further includes preparing a masked facial image by separating one or more areas comprising skin-pixels and one or more areas comprising pixels related to non-skin information. The method further includes generating a synthetic image comprising photo-realistic skin patterns. The method further includes obtaining an anonymized facial image by concatenating the masked facial image with the generated photo-realistic skin patterns.

20 Claims, 5 Drawing Sheets

(56) References Cited

OTHER PUBLICATIONS

Yi, Illumination Normalization of Face Image Based on Illuminant Direction Estimation and Improved Retinex, PLOS ONE 2014 (Year: 2014).*
Oliveira "Fast Digital Image Inpainting", VIIP 2001 (Year: 2001).*
Chakraborty "Fusion-based Skin Detection using Image Distribution Model" ICVGIP, Dec. 18-22, 2016 (Year: 2016).*
Li Tao et al: "AnonymousNet: Natural Face De-Identification with Measurable Privacy," 2019 IEEE/CVF Conference on Computer Visionh and Pattern Recognition Workshops (CVPRW), IEEE, Jun. 16, 2019, pp. 56-65.

* cited by examiner

METHOD AND SYSTEM FOR ANONYMIZING FACIAL IMAGES

CROSS REFERENCE TO RELATED APPLICATIONS

This application claims priority to European Patent Application No. 21168284 titled Method and System for Anonymizing Facial Images and filed on Apr. 14, 2021. The entire content of the referenced application is hereby incorporated in its entirety.

BACKGROUND

1. Field

The present disclosure relates to computer vision and machine-learning algorithm-based facial image processing and facial skin analysis, and more specifically relates to methods and systems for anonymizing facial images.

2. Description of the Related Art

In facial image analysis, researchers and practitioners face a number of challenges caused by the limitations of clinical criteria and traditional skin evaluation systems based on computer vision and machine-learning algorithms. These limitations have a significant impact on the quality of research and recommendations of consumer cosmetics products, aesthetic products, medical dermatology drugs, and over the counter drugs; such limitations may undesirably lead to biased results.

Currently, cosmetics legislation in many jurisdictions indicates that every cosmetic product placed on the market should be safe to use. Not only regulators, but customers too demand higher transparency from the manufacturers as the awareness of possible adverse effects of some previously wide-spread compounds raises objective evidence of product effectiveness. Also, it is not enough that products are safe, they must be effective and enable a meaningful improvement of the skin condition. The effect of cosmetics products on humans must be determined and efficacy must be measured in a qualitative and quantitative way to prove the claimed effects. As of today, the part of the body that gets the most attention from cosmetics and skin health product manufacturers is facial skin. Hence, there is a need to evaluate the safety and effectiveness of products on parameters including but not limited to wrinkles, firmness, skin irritation, and hyperpigmentation. In order to evaluate safety and effectiveness of products, several facial image analysis techniques are currently being used.

In addition, the regulations in cosmetic and medical industries require data privacy when storing and processing facial photos of study participants or patients and customers, which is not enabled by presently available solutions.

The known methods for skin measurement and analysis have several limitations. For example, instrumental and sensorial methods based on the biophysical principles provide valuable insights, however, they may require special lab devices and they mostly focus on the isolated skin areas. Imaging methods allow conducting high-throughput studies and introduce a standard approach, which reduces variability in results and provides a high level of reproducibility. Clinical methods reflect a broader evaluation of a face or facial zone. Both clinical and imaging methods utilize high-resolution and quality facial images as input data to generate meaningful and accurate results. However, an accuracy of image analysis can undesirably be impacted by at least one of inconsistent lighting, overexposure, underexposure, low resolution, or wrong head position.

The types of image features that have adverse effects on facial skin parameters and biomarker assessments are image background and facial features that are not related to skin, which cause biases for both human expert evaluators and neural network algorithms. For example, a human can use grey hair color unconsciously when evaluating facial wrinkles, and algorithms can use the grey hair feature or background during the training process to predict a wrinkle score; in this manner, both humans and algorithms often discriminate against the study participant (e.g., the human or algorithm may score a greater quantity of wrinkles based on the presence of grey hair). The known computer vision algorithms used for facial image processing make additional mistakes when evaluating skin. For example, neural network-based algorithms may confuse a single hair with wrinkles because of their geometric similarity.

However, the photos taken during clinical research and examinations or in the framework of telemedicine services are not analyzed for quality and it is challenging to standardize such photos, especially if they are taken personally by the study participant. Additionally, different levels of illumination, resolution, presence of noise, and misfocus make it difficult to analyze and compare the facial images. Algorithmic analysis of skin is typically biased based on image quality; for example, a subject with fair skin tone can be misclassified as having tan skin tone only due to the illumination conditions in the photograph. Moreover, some patients may need guidance when capturing images of different body parts as it might be inconvenient to take photos of particular body parts.

Several known facial image processing techniques widely used in areas like security, movement tracking, and identification fail to accurately mask skin for further skin analysis and also fail to eliminate the effect of background features which may have an impact on the facial assessment. Further, the known facial image processing techniques may tend to generate anonymized images that have information which is unrelated to skin and irrelevant for skin assessment (e.g., information associated with eyebrows, lashes, nostrils, hairs, and the like). Presence of the irrelevant non-skin information in the image undesirably increases an image size and makes abundant storage resources a considerable requirement for researchers working with relatively large datasets.

Some existing facial image processing techniques provide a methodology for at least one of blurring or pixelization of facial images to anonymize them; however, such techniques may not be utilized for facial skin research purposes as they cause loss of skin pixels located closely to blurred or pixelated regions that contain significant information about facial skin features. If the blurred or pixelized zone becomes smaller, allowing for such skin analysis, the method ceases to be anonymized.

Therefore, in light of the foregoing discussion, there is a need to overcome the aforementioned drawbacks associated with existing techniques for facial skin analysis.

SUMMARY

The present disclosure provides methods and systems for anonymizing a facial image that reduces or eliminates errors in facial image recognition for facial skin and facial biomarkers analysis. An aim of the present disclosure is to provide a solution that at least partially overcomes the problems encountered in the field.

In various embodiments, the present disclosure provides a computer-implemented method for anonymizing a facial image, the method comprises detecting one or more sets of facial keypoints in the facial image; standardizing the facial image; preparing a masked facial image by separating one or more areas comprising skin-pixels and one or more areas comprising pixels related to non-skin information; generating a synthetic image comprising photo-realistic skin patterns; and obtaining an anonymized facial image by concatenating the masked facial image with generated photo-realistic skin patterns.

In various embodiments, the present disclosure provides a system for anonymizing a facial image, the system comprising a memory and a processor configured to perform the method for anonymizing a facial image, wherein the memory is configured to store a set of modules for anonymizing the facial image; the processor is configured to execute the set of modules, wherein the set of modules comprises: detection module configured to detect one or more sets of facial keypoints in the facial image; a standardization module configured to standardize the facial image; a segmentation module configured to separate from the facial image one or more areas comprising non-skin pixels for preparing a masked facial image; a skin pattern generation module configured to generate the synthetic image with photo-realistic skin patterns; and an anonymization module configured to concatenate the synthetic with the masked image for filling the related to non-skin information.

In various embodiments, the present disclosure provides a computer program for anonymizing a facial image comprising instructions adapted to perform the method according to the present disclosure, when the computer program is executed by the system comprising the processor.

Embodiments of the present disclosure provide an efficient technique for anonymizing a facial image that eliminates irrelevant pixels that do not correspond to skin (e.g., hairs, eyebrows, deep shadows, lashes, nostrils, and other non-skin defects such as non-skin texture and color covering part of a face, light glares, and tattoos). The techniques disclosed herein facilitate conducting an unbiased assessment of facial skin, while minimizing errors in skin assessment and enabling both human evaluators and algorithms to focus solely on skin features.

Additional aspects, advantages, features, and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating various embodiments of the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The disclosure provides computer-implemented methods, systems, and computer programs to eliminate errors in facial image recognition for facial skin and facial biomarker analysis, and to obtain a fully anonymized image of the human face (while preserving all areas of the face), which possess important markers for the evaluation of facial skin condition and facial biomarkers of a patient. The embodiments of the present disclosure may be utilized during studies of human volunteers using imaging methods and clinical methods by using computer vision algorithms to pre-process images of human faces for subsequent analysis by computer vision methods, particularly neural-network based algorithms, or for clinical evaluation by human experts using visual clinical signs. Thus, the embodiments of the present disclosure allow for minimization or elimination of errors in skin assessment and allow both human evaluators and algorithms to focus solely on skin features. For example, the embodiments of the present disclosure enable elimination of irrelevant pixels in facial image analysis that do not correspond to skin such as hairs, eyebrows, and deep shadows which facilitate conducting an unbiased assessment of facial skin, i.e., broken and irrelevant pixels of the areas of the facial skin image that do not correspond to the skin. In addition to error elimination, the embodiments allow anonymization of the facial image to establish high data privacy standards. Moreover, the embodiments of the present disclosure enable transformation of the facial image into a light-weighted format to reduce computer memory and processing costs during image processing and storage.

The embodiments of the present disclosure may be used to conduct subsequent facial image analysis by human experts or by computer vision algorithms and automated systems for image analysis. Additionally, the embodiments of the present disclosure enable clinical specialists to effectively use photographic patient data, monitor patient progress, and visually compare the results by facilitating creation of guided data collection and standardization methods. Further, the embodiments of the present disclosure enable patients and other users to easily provide the necessary data, relying on clear guidelines and artificial intelligence (AI)-based standardization algorithms, such that the standardized collected data may be further analyzed by AI-based diagnostic software tools (which may include relevant medical device certification). The embodiments of the present disclosure can be utilized during studies in human volunteers using imaging methods and clinical methods. The embodiments of the present disclosure enable facial imaging methods to conduct relatively high-throughput studies and introduce a standard approach and thus less variability in results, as well as relatively high-level reproducibility.

In various embodiments, the present disclosure provides a computer-implemented method for anonymizing a facial image, the method comprises detecting one or more sets of facial keypoints in the facial image; standardizing the facial image; preparing a masked facial image by separating one or more areas comprising skin-pixels and one or more areas comprising pixels related to non-skin information; generating a synthetic image comprising photo-realistic skin patterns; and obtaining an anonymized facial image by concatenating the masked facial image with generated photo-realistic skin patterns.

In another aspect, various embodiments of the present disclosure provide a system for anonymizing a facial image, the system comprising a memory and a processor configured to perform the method for anonymizing a facial image, wherein the memory is configured to store a set of modules for anonymizing the facial image; the processor is configured to execute the set of modules, wherein the set of modules comprises: a detection module configured to detect one or more sets of facial keypoints in the facial image; a standardization module configured to standardize the facial image; a segmentation module configured to separate from the facial image one or more areas comprising non-skin pixels for preparing a masked facial image; a skin pattern generation module configured to generate the synthetic image with the photo-realistic skin patterns; and an anonymization module configured to concatenate the synthetic with the masked image for filling the related to non-skin information.

In a third aspect, various embodiments of the present disclosure provide a computer program for anonymizing a facial image comprising instructions adapted to perform the method according to the present disclosure, when the computer program is executed by the system comprising the processor.

The method comprises detecting one or more sets of facial keypoints in the facial image. The facial image used as an input may be formatted as or converted to any digital representation such as a standard RGB, LAB, or HSV color representation. The RGB color representation may be preferred in some embodiments as it is recognizable by both computer vision algorithms and humans. Throughout the present disclosure, the term "facial keypoints" may refer to a general term that defines a set of three-dimensional (3D) or two-dimensional (2D) points with coordinates for a face detection task, which may be optionally united to facial features-related groups (e.g., "right eye contour", or "jaw line"). The term "facial keypoints" may be synonymous with terms such as facial landmarks, dense mesh, facial mesh, 3D mesh, 3D mask, and the like. The facial keypoints enable localization of a plurality of facial regions including eyebrows, eyes, mouth, nose, and the like including determining a position of the face in the facial image, and by using facial keypoints, further determining areas and pixels considered as irrelevant (i.e., broken pixels, irrelevant pixels) for further facial skin analysis.

To localize a region of interest on the facial image, different approaches may be used. To achieve an optimal combination of accuracy and required computational time, which allows for determination of facial keypoints and corresponding facial regions, the system is configured to detect one or more sets of facial keypoints by a single based facial keypoint detector, or by a more complicated configuration (e.g., two detectors, a detector with more than one set of predictions, or the like). This enables localization of the facial keypoints and corresponding key facial regions with greater accuracy.

Optionally, to achieve more accurate results, detecting the one or more sets of facial keypoints may be performed by using one or more pre-trained neural network models and one or more three-dimensional facial alignment models. In several embodiments, deep learning-based algorithms are applied to detect facial keypoints in an input image. The one or more pre-trained neural network models may be trained to work with laboratory photographs and photographs containing one face in it. The one or more pre-trained neural network models may include, for example a Dlib face recognition technology, which allows for the identification of at least 68 facial keypoints, localization of the facial region under the face, and pulls the facial keypoints from the localized area. Such localization of the area of interest on the facial image may be optimized in accuracy and computational time, which allows detection of one or more sets of facial keypoints in the facial image for further processing in the best way without loss in accuracy or inference time.

The one or more three-dimensional facial alignment models, e.g., a Dense Mesh automatic facial alignment as a facial recognition model with relatively greater detail, enables localization of more than 400 facial keypoints on a three-dimension (3D) mask and for a 3D image. In various embodiments, a 3D cascade regression is used, in which facial features are the same in all poses.

Such double detector combination of one or more pre-trained neural network models and one or more three-dimensional facial alignment models enables improvement of the accuracy of the analysis of facial image. For example, using other facial recognition technologies or single detector facial recognition results in reduced accuracy and increased inference time and thus strongly reduces the quality of outputs of further steps of the present method. Thus, it is desirable to use the double detector combination described herein.

According to the present disclosure, the system is further configured to perform the method step of standardizing the facial image. The standardization of the facial image is important for next steps of the method and may be necessary to enable human evaluators and neural network algorithms to perform the facial image analysis and make recommendations of cosmetics products and dermatology drugs. The standardization enables improvement of the stability of further evaluation steps, eliminates the negative effects of the facial images, especially to improve illumination estimation and correction of self-made photos of subjects and to correct the color shift, which affects the perception of the skin parameters for human and algorithmic validation.

Optionally, in various embodiments, standardizing the facial images comprises at least one of: correcting a color distribution and a tone, correcting an illumination, cropping surrounding area of a face in the facial image, correcting a rotation of the face in the facial image, correcting a position of the face relative to the facial image, or correcting a resolution of the facial image. Correcting the color distribution and the tone may be necessary for evaluating color dependencies of the cheek and forehead regions to separate the skin pixels and irrelevant pixels. Correcting the illumination is based on the eye whites regions which are detected with color clustering algorithm in the region of the detected eyes or from the color palette. Illumination affects the classification of skin tone. Thus, correcting the illumination enables classification of the skin tone more precisely and improves the stability of the further evaluation steps, the analysis, and comparing the facial images. Cropping the surrounding area of the face in the facial image speeds up processing and allows avoidance of the appearance of unnecessary information about the background of the facial image outside the area of interest, particularly background or estimate of an angle and perform correction. Further, geometric angles in space relative to the photograph can be determined based on the triangulation by meaningful face area position. Correcting the rotation enables elimination of the negative effect of head rotation turns and to center the face in the facial image. Correcting the position of the face relative to the facial image comprises aligning the face in the center with respect to face angles to perform even position of the face relative to the facial image. Correcting the resolution of the facial image enables to improve the analysis and comparing the facial images.

In various embodiments, standardizing the facial image comprising a representation of a face and non-skin information comprises surrounding an area of the face in the facial image by cropping to obtain a cropped facial image. An angle of orientation of the face in the facial image is estimated and correction is performed to obtain a corrected rotation of the face in the facial image. The facial image, wherein the rotation of the face is corrected, is aligned to be in the center to obtain a correction of a position of the face relative to the facial image. Coordinates of the facial keypoints are used to ensure the face is geometrically aligned, such that the head rotation and inclines are automatically estimated and corrected, the face position is centered in the facial image, and finally the background non-skin information is eliminated to obtain the standardized image.

In various embodiments, standardizing the facial images further comprises correcting illumination, which is performed by detecting with a color clustering algorithm a color area in at least one detected facial keypoint, applying from a color palette, or applying from a laboratory color chip. The illumination correction is applied for non-laboratory made photos. The illumination correction is applied based on the eye white regions that are detected using a color clustering algorithm in the region of a detected eye or by detecting a color area using a color clustering algorithm in at least one detected facial keypoint. The illumination correction is applied from a color palette or applied from a laboratory color chip. The color palette is produced to the full match of the tap (eye whites or laboratory color chip) with the highlighted color, to the one of interest. Notably, the color distribution and illumination correction have an impact on the perception of respondent skin parameters for human and algorithmic validation. In various embodiments, the position of the face is corrected relative to the facial image. In various embodiments, a linearity of the model modifies whole image colors in a laboratory color-space, using a least square method in the area of interest which allows simulations of neutral lightning conditions. Notably, color standardization may be important for next steps of the method and necessary for human or algorithmic skin validation since shadows or glares on images can dramatically influence the process of further skin evaluation and make recommendation systems irrelevant. In various embodiments, one or more facial features coordinates are used to ensure the face is geometrically aligned.

The system is further configured to perform the method step of preparing a masked facial image by separating one or more areas comprising skin-pixels and one or more areas comprising pixels related to non-skin information. The image pixels are divided into areas comprising skin-pixels and areas comprising pixels related to non-skin information, i.e., irrelevant non-skin pixels. The detected one or more sets of facial keypoints allow better to localize areas of interest and select all regions which will in the next step of the method be marked with skin separators models. As a result, the masked facial image of skin pixels is built. The masked facial image defines areas of interest for further steps, wherein only skin areas of facial image will be represented and processed for next steps. The mask facial image is a binary image, stating which pixels should be taken from the original facial image for further analysis. The obtained skin mask is applied to the standardized image to remove from it all areas comprising pixels related to non-skin information.

Optionally, separating one or more areas comprising skin-pixels and one or more areas comprising pixels related to non-skin information is performed by at least one of: evaluation of color dependencies and distributions in image or by a convolutional neural network configured to segment skin pixels. The separation of areas comprising skin-pixels and areas comprising pixels related to non-skin information is based on the color dependencies and distributions of the face regions of one or more areas comprising skin-pixels (e.g., a cheek, a forehead, a nose, chins, an eye area) or based on predictions of a pre-trained convolutional neural network to segment skin pixels and non-skin pixels. The mean colors of the face regions of one or more areas comprising skin-pixels are analyzed in LAB color space and HSV (hue, saturation, value) color space to find unique patterns for the subject color scheme of the skin.

The convolutional neural networks are trained by segmentation models, which allows for separation of all irrelevant pixels, which correspond to non-skin related areas, e.g., hairs, eyebrows, deep shadows, and other non-skin defects, and produce skin mask, and fully anonymize the person image. When using segmentation constructed only on facial landmarks it does not allow for separation of non-skin pixels, such as hairs or eyebrows. The presence of these patterns in the future may lead to the bias in skin evaluation.

Optionally, the one or more convolutional neural network models are trained on one or more phenotype datasets comprising images representing skin areas. The convolutional neural network models are configured to accurately separate the areas comprising skin-pixels and areas comprising pixels related to non-skin information on input facial image in at least two classes. The convolutional neural networks are trained on the dataset comprising a wide range of human phenotypes including diverse races, hair colors, and age groups to avoid bias in final application.

Optionally, separating one or more areas comprising skin-pixels and one or more areas comprising pixels related to non-skin information is performed by using a segmentation constructed on the detected one or more sets of facial keypoints, morphology segmentation, or Gabor filtering-based segmentation. Skin and not-skin pixel classification may be determined based only on facial landmarks points, but this way it is not guaranteed that all not-skin pixels will be removed. The segmentation constructed on the detected one or more sets of facial keypoints, morphology segmentation, or Gabor filtering-based segmentation enable thus to guarantee more precise and acceptable precision.

The system is further configured to perform the method step of generating a synthetic image comprising photo-realistic skin patterns. The masked facial image obtained by separating one or more areas comprising skin-pixels and one or more areas comprising pixels related to non-skin information is fed to the pre-trained neural network, which is configured to generate the photo-realistic skin patterns corresponding to the image based on variations in a latent space of the network. Using such pre-trained networks allows for generation of photorealistic skin patterns. Generating the synthetic image comprising photo-realistic skin patterns is performed by synthesizing the skin pattern background to fill the separated one or more areas comprising pixels related to non-skin information of the initial facial image.

Optionally, generating the photo-realistic skin patterns comprises performing skin image compression to a latent space representation by one or more neural networks or dimension reduction computational methods. These methods enable more effective skin image compression. As used herein, the term "latent space" refers to a mapping of the original picture in the space of its presentation for the further generation network. The latent space may include skin pattern information and other information, which is not related to skin patterns (e.g., image resolution or other details that are not related to the skin). Examples of the neural networks include, but are not limited to, autoencoders, variational encoders, generative adversarial networks (GAN), and combinations thereof. Examples of the dimension reduction computational methods include, but are not limited to, component analysis methods such as principal component analysis (PCA), independent component analysis (ICA), or image matrix factorization methods. While using GAN for generating the photo realistic skin patterns, a diverse training dataset is used with a wide range of human phenotypes to avoid biasing in application for generating a variety of resulting pictures.

Optionally, performing skin image compression to a latent space representation further comprises performing a search for photo-realistic skin pattern-related dimensions by one or more neural networks or by a computational method selected from a group of unsupervised machine learning methods comprising clusterization, unsupervised neural networks, principal component analysis, independent component analysis, and singular value decomposition. These methods enable determination in the latent space of the skin related information for generating the photo-realistic skin patterns.

Optionally, generating the synthetic image of photo-realistic skin patterns is performed by using one or more inpainting algorithms selected from a group comprising a skin pattern generator and a solid background color selection. The one or more inpainting algorithms enable reduction of the computational time.

The system is further configured to perform the method step of obtaining an anonymized facial image by concatenating the masked facial image with generated photo-realistic skin patterns. Optionally, concatenating comprises combining masked facial image with the synthetic image by one or more computational methods for filling one or more areas on the masked facial image comprising pixels related to non-skin information with generated photo-realistic skin patterns from the synthetic image. Concatenating the masked facial image with generated photo-realistic skin patterns enables one to obtain fully anonymized facial image prepared for further processing (e.g., evaluation, analysis, validations).

Optionally, concatenating further comprises edge-effect reduction between areas from the masked facial image and areas from the synthetic image on anonymized facial image by one or more computational methods. In several embodiments, the edge-effect reduction is performed using computer vision methods such as blurring the borders of two images, for a soft transition border, averaging the characteristics of images in the bonding zone in frequency decomposition domain (for the modifications in frequency domain such as Fourier transformations can be used), Laplace pyramids, wavelet transformations, filtering, and the like.

In several embodiments, the photo-realistic skin patterns which fill the separated one or more areas comprising pixels related to non-skin information in the image are sampled to create background picture texture with initial size. For example, a frequency domain equalization algorithm can be used as a computational method to process the corners of the masked facial image, where the skin part of face is concatenated with the generated skin patterns and smoothly change frequency response of the skin pattern to softly cover sharp concatenation points. The algorithm allows modification of sample images to smoothly cover patterns of reference. The resulting image is an anonymized facial skin atlas presenting a completely anonymized and standardized facial image.

Alternatively, other computational methods can be used. For example, skin pattern generators may be replaced with other inpainting algorithms or with solid background color selection. This way the computational timing is shorter, but has a disadvantage in the way of further algorithmic analysis. All corners in the field of interest from the masked facial image have significant nonlinearity in the way of future validation. Solid background will produce a lot of corner defects which negatively affect the perception of skin image.

The present disclosure provides a system for anonymizing a facial image. The anonymization of the facial image eliminates irrelevant pixels that do not correspond to skin like hairs, eyebrows, deep shadows that facilitates conducting an unbiased assessment of facial skin. For example, facial images have unique facial geometry and features, it may be possible that some hairs can cover the forehead and interfere with further processing. Thus, the presence of foreign objects in the frame does not allow for a high-quality analysis of the skin. The system of the present disclosure enables minimization and elimination of errors in skin assessment and allows both human evaluators and algorithms to focus solely on skin features. In addition to error elimination, the system of the present disclosure allows anonymization of the facial image to establish high data privacy standards. Moreover, the system of the present disclosure transforms the facial image into a light-weighted format to save computer memory during processing and required storage. Also, the system of the present disclosure can be used to conduct subsequent facial image analysis by human experts or using computer vision algorithms and automated systems for image analysis. Additionally, the system of the present disclosure enables clinical specialists to effectively use photographic patient data, monitor patient progress, and visually compare the results by facilitating creation of a guided data collection and standardization. Further, the system of the present disclosure enables patients to easily provide the necessary data, relying on clear guidelines and artificial intelligence (AI) based standardization algorithms, such that the standardized collected data can be further analyzed by AI-based diagnostic software tools with relevant medical device certification. The system of the present disclosure can be utilized during studies in human volunteers using imaging methods and clinical methods. The system of the present disclosure enables imaging methods to allow conducting of high-throughput studies and introduce a standard approach and thus less variability in results and high level or reproducibility.

The system for anonymizing a facial image comprises a memory and a processor configured to perform the method according to the preset disclosure. The memory is configured to store a set of modules for anonymizing the facial image and the processor is configured to execute the set of modules, wherein the set of modules comprises a detection module, a standardization module, a segmentation module, a skin pattern generation module, and an anonymization module. The detection module is configured to detect one or more sets of facial keypoints in the facial image. The standardization module is configured to standardize the facial image. The segmentation module is configured to separate from the facial image one or more areas comprising non-skin pixels for preparing a masked facial image. The skin pattern generation module is configured to generate the synthetic image with photo-realistic skin patterns. The anonymization module is configured to concatenate the synthetic image with the masked image for filling the pixels related to non-skin information.

The embodiments of the system for anonymizing facial images can be implemented as a web-based system (or an app system, or a software system operated on a single computer or a distributed computing system) which allows users to conduct anonymized analysis of study subjects by preparing the initial facial image to standardized anonymized view. In various embodiments, the system comprises a data collection tool, which allows collection photos of various areas of dermatological concerns, such as hands, face, and body skin images. Upload of the photos to the system is enabled from a user device (e.g., a smartphone, a desktop computer, a tablet, portable dermoscan). Image standardization is carried out by using a user interface of the system, as well as using computer vision algorithms. The user interface is configured to provide to the user guidelines how to take the photo. The system according to various embodiments of the present disclosure is configured automatically to evaluate the quality of the image taken.

In various embodiments, the system comprises an extension configured to perform live data collection with live feedback on the quality of the images. The system is configured to calculate algorithmically such parameters as the level of illumination, image resolution, the position of the face or hands, and the color distribution. As soon as the image is received in the system, the system is configured to issue a detailed report on the photo quality.

Optionally, the system further comprises one or more application programming interfaces configured to execute collection of facial images to be analyzed, and to execute analysis of the anonymized facial images. In the various embodiments, the system is configured to receive raw skin images (e.g., facial, hand, or other skin images) and to process the received images according to the embodiments of the present disclosure. In various embodiments, the system comprises two application programming interfaces (APIs) connected to the processor, i.e., a first API configured to execute collection of facial images to be analyzed and a second API configured to execute analysis of the anonymized facial images, and provide the executed analysis to the user device. The first API configured to execute collection of facial images to be analyzed facilitates connection of the computing devices of service providers (e.g., doctors, dermatological clinics and specialists, telemedicine service providers, research organizations, etc.) to the system for data collection. The data collected in the system by the first API may include, e.g., non-standardized consumer data (e.g., skin images and metadata). The second API configured to execute analysis of the anonymized facial images enables, based on the data collection and analysis, providing via user devices to the users (e.g. patients, consumers, etc.) skin analytics data; recommendations; remote monitoring; instructions and real-time assessment; immediate access to a detailed reports on the quality of the photo illumination, position, resolution and other standardization features; and post-processing functionality to align the light sensitivity and color balance, etc.

The system can be called both in conjunction with the user interface and further internal validation, or by calling of implementation using the one or more application programming interfaces (API). In both cases, the end-user conducting the clinical trial is able to safely and accurately post-analyze the resulting facial image.

Algorithmic post-processing of the resulting photos applied to align the light level and color balance (e.g., by eye white correction). Standardized facial images are collected through a dedicated endpoint and are shown in web-based dashboards for the users. Collected standardized images enable clinicians to track patient dynamics more accurately, analyze and compare data and finally to unify clinical trials.

The APIs enable the system to be applied, e.g., to the work of dermatological specialists in order to monitor the condition of patients, compare and analyze data obtained from patients; to the decentralized clinical trials to generate equally standardized data; and to the remote monitoring of patients, when patients can independently upload the standard image data with the help of quality AI algorithms.

The present disclosure further provides a computer program for anonymizing a facial image comprising instructions adapted to perform the method according to the present disclosure, when the computer program is executed by the system comprising the processor.

The disclosed embodiments of the method, system, and computer program enable one to obtain fully anonymized facial images of a consumer facial skin, which can be transferred for further machine or human face validation. Anonymity and unbiased diversity are one of the main goals in the field of consumers application projects. This may be especially true when the target hits the medical and cosmetic field. Both areas of interest require a large set of commitments in security and quality in technical solutions to be robust. Robustness and precision of this validation will be conditioned by the absence of all regions that are not insignificant for the analysis. The present method, system, and computer program enables one to solve these problems for, e.g., anonymization for telemedicine services, for consumer and perceived beauty studies in the cosmetics field, for clinical trials and studies in the medical field, and for cosmetics product recommendations for end consumers (e.g., anonymization, skin metrics assessment).

Thus, the embodiments of the present disclosure enable to evaluation of the safety and effectiveness of products on parameters including but not limited to wrinkles, firmness, skin irritation, and hyperpigmentation; to ensure data privacy when storing and processing anonymized facial photos of participants or patients; to overcome illumination, resolution, presence of noise and misfocus problems and to reduce loss of skin pixels in the facial images.

DETAILED DESCRIPTION OF THE DRAWINGS

Figure 1A:
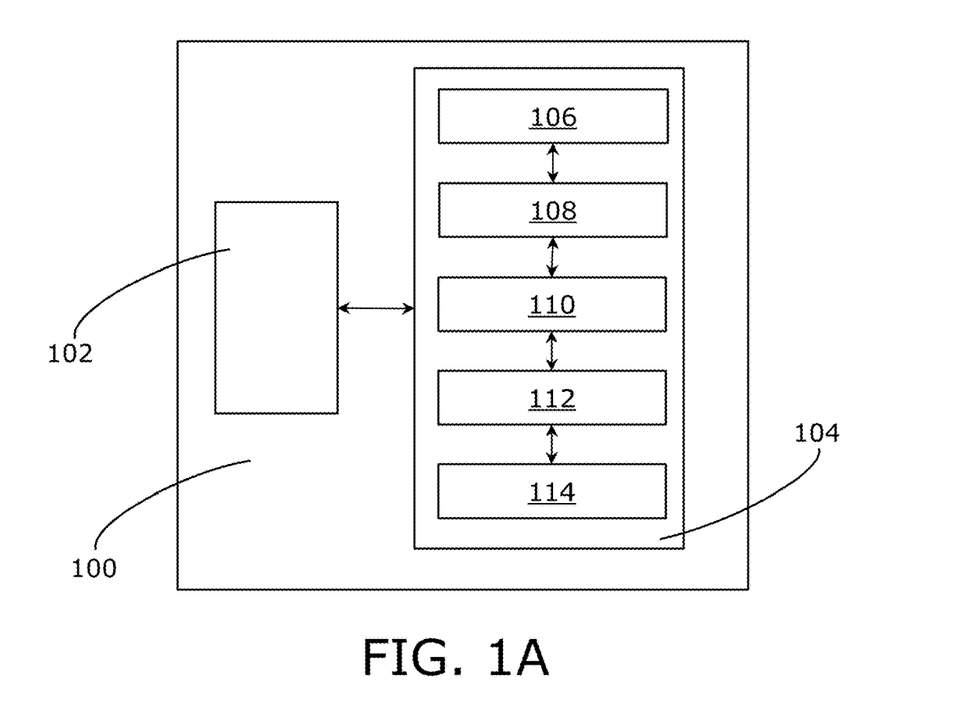
FIG. 1A depicts a schematic illustration of a system for anonymizing a facial image in accordance with various embodiments of the present disclosure.

FIG. 1A depicts a schematic illustration of a system 100 for anonymizing a facial image in accordance with various embodiments of the present disclosure. The system 100 comprises a memory 102 and a processor 104. The memory 102 is configured to store a set of modules for anonymizing the facial image. The processor 104 is configured to execute the set of modules for anonymizing the facial image. The set of modules comprises a detection module 106, a standardization module 108, a segmentation module 110, a skin pattern generation module 112, and an anonymization module 114. The detection module 106 is configured to detect one or more sets of facial keypoints in the facial image. The standardization module 108 is configured to standardize the facial image. The segmentation module 110 is configured to separate from the facial image one or more areas comprising non-skin pixels for preparing a masked facial image. The skin pattern generation module 112 is configured to generate the synthetic image with photo-realistic skin patterns. The anonymization module 114 is configured to concatenate the synthetic with the masked image for filling the related non-skin information.

Figure 1B:
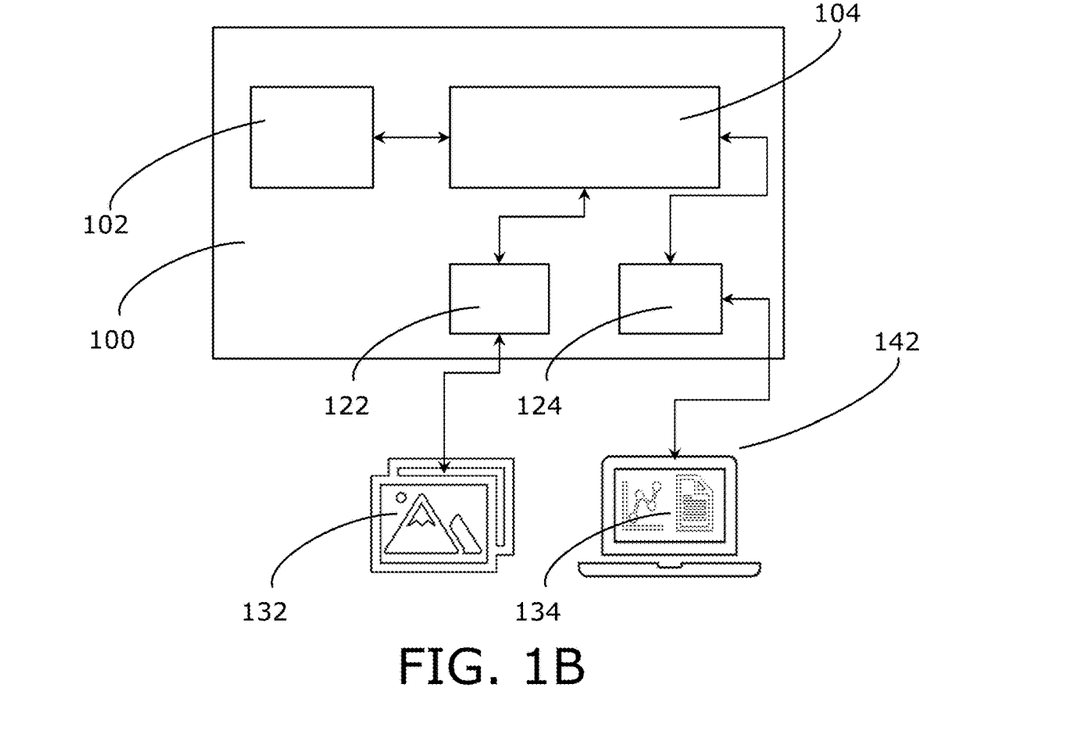
FIG. 1B depicts a schematic illustration of a system for anonymizing a facial image, in accordance with various embodiments of the present disclosure.

FIG. 1B depicts a schematic illustration of a system 100 for anonymizing a facial image in an alternative embodiment, wherein the system 100 includes two application programming interfaces (API) connected to the processor, i.e., a first API 122 configured to execute collection of facial images 132 to be analyzed and a second API 124 configured to execute analysis of the anonymized facial images 134, and provide the executed analysis to the user device 142.

Figure 2A:
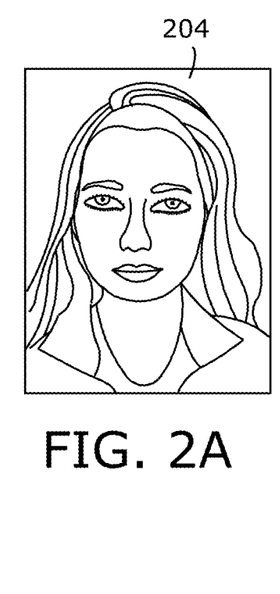
FIG. 2A illustrates an exemplary non-standardized facial image of a person collected with a photography device, in accordance with various embodiments of the present disclosure.
Figure 2B:
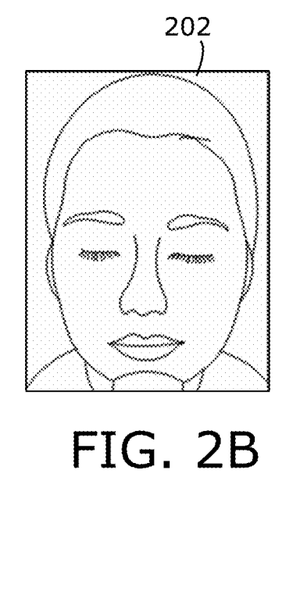
FIG. 2B illustrates an exemplary image of person collected with an equipment that fixes head positions and illumination setup, in accordance with various embodiments of the present disclosure.

FIG. 2A and FIG. 2B illustrate an exemplary input facial images for generating an anonymized facial image using the method and system of the present disclosure, in accordance with various embodiments. FIG. 2A depicts a non-standardized facial image 204 of person 202 collected with a photography device. FIG. 2B depicts a facial image 208 of person 206 collected with specific equipment that fix head positions and illumination setup.

Figure 3A:
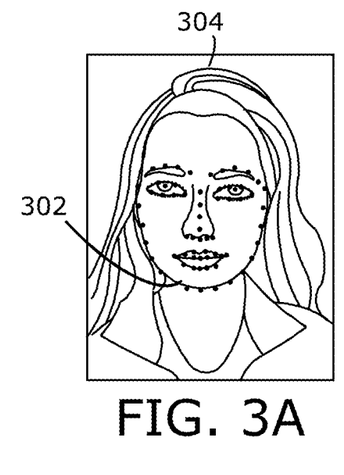
FIG. 3A and FIG. 3B illustrate detecting one or more facial keypoints in the facial image of the person, in accordance with various embodiments of the present disclosure.
Figure 3B:
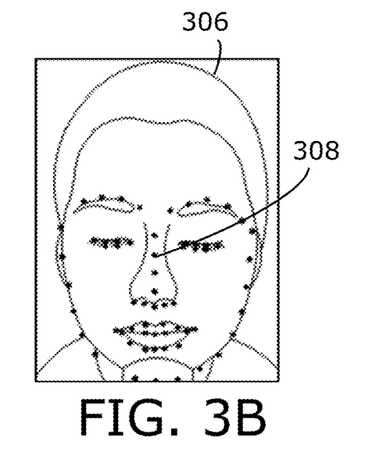

FIG. 3A and FIG. 3B illustrate detecting one or more facial keypoints in the facial image of the person, in accordance with various embodiments. FIG. 3A depicts the facial keypoints marked using dotted marking 302 in the facial image 304 of the person. FIG. 3B depicts a view of a facial image collected with specific equipment that fix head positions and illumination setup 306 depicting the facial keypoints marked using dotted marking 308. The facial keypoints enable localization of a plurality of facial regions including eyebrows, eyes, mouth, and nose as depicted in FIG. 3A and FIG. 3B. The one or more sets of facial keypoints are detected using one or more pre-trained neural network models and one or more three-dimensional facial alignment models.

Figure 4:
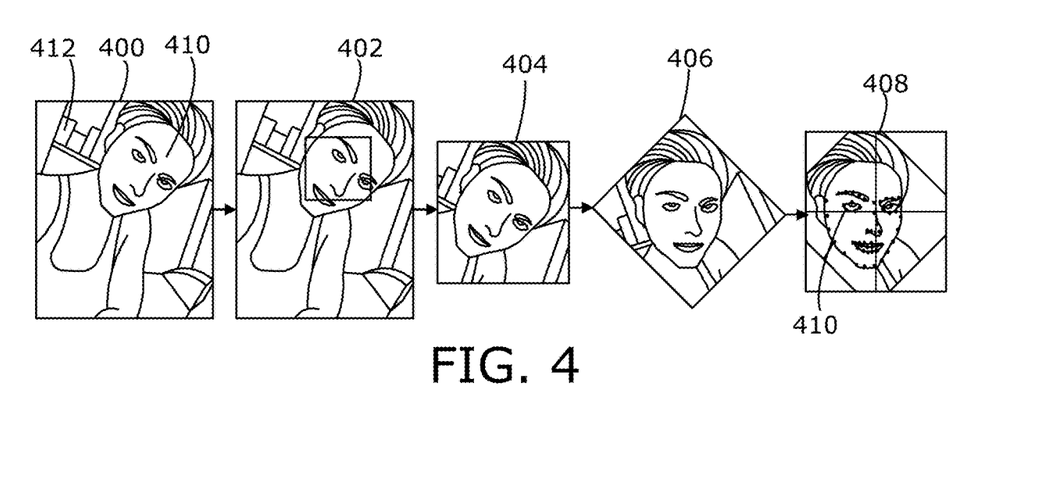
FIG. 4 depicts standardizing a facial image, in accordance with various embodiments of the present disclosure.

FIG. 4 depicts standardizing a facial image 400 comprising representation of a face 410 and non-skin information 412, in accordance with various embodiments. A surrounding area of a face 402 in the facial image 400 is cropped to obtain a cropped facial image 404. An angle of orientation of the face 402 in the facial image 400 is estimated and correction is performed to obtain a corrected rotation of the face in the facial image 406. The facial image, wherein the rotation of the face is corrected 406 is aligned to be in the center to obtain a correction of a position of the face relative to the facial image 408. As depicted in FIG. 4, coordinates of the facial keypoints 410 are used to ensure the face is geometrically aligned, such that the head rotation and inclines are automatically estimated and corrected, the face position is centered in the facial image, and finally the background non-skin information is eliminated to obtain the standardized image 406.

Figure 5A:
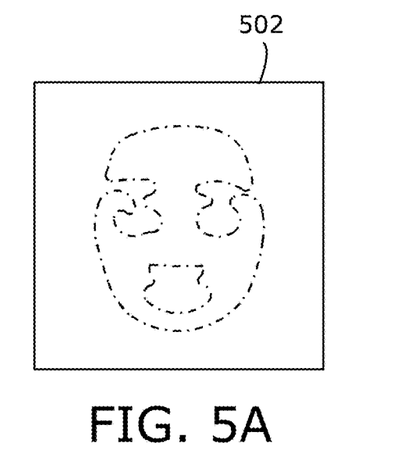
FIG. 5A and FIG. 5B depict preparing a masked facial image by separating one or more areas comprising skin-pixels and one or more areas comprising pixels related to non-skin information, in accordance with various embodiments of the present disclosure.
Figure 5B:
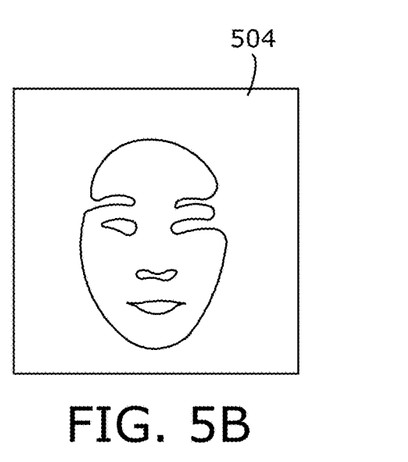

FIG. 5A and FIG. 5B depict preparing a masked facial image by separating one or more areas comprising skin-pixels and one or more areas comprising pixels related to non-skin information, in accordance with various embodiments. As depicted in FIG. 5A, a mask is applied to a standardized image to build a mask of skin pixels 502, and one or more areas comprising skin-pixels and one or more areas comprises pixels related to non-skin information are separated. The separation is performed by at least one of: evaluation of color dependencies and distributions and facial keypoints-based areas definition in image or by a convolutional neural network configured to segment skin pixels and a masked facial image 504 is obtained as an end result. The separation of one or more areas comprising skin-pixels and one or more areas comprises pixels related to non-skin information allows to separate all irrelevant pixels, which correspond to hairs, eyebrows, deep shadows and other non-skin defects.

Figure 6A:
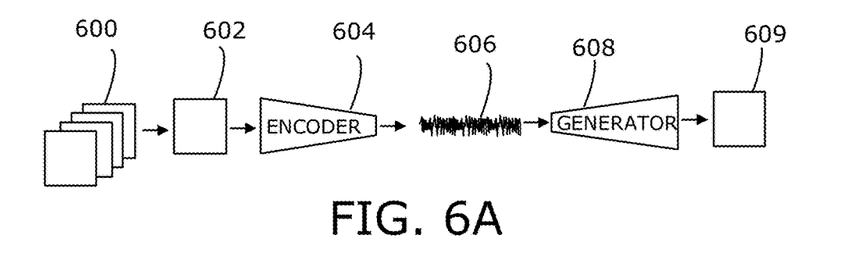
FIG. 6A depicts a systematic process flow diagram of generating a synthetic image comprising photo-realistic skin patterns, in accordance with various embodiments of the present disclosure.

FIG. 6A depicts a systematic process flow diagram illustrating a process for generating a synthetic image comprising photo-realistic skin patterns, and a process of training neural networks, in accordance with various embodiments. A real skin crop 602 from among a plurality of skin crops 600 is fed into an encoder 604 for generating an encoded crop representation 606 in a latent space. That is, the encoder 604 may compress cropped images into a representation in a latent space. The encoded crop 606 is fed into a generator 608 for generating a reconstructed skin crop 609.

Figure 6B:
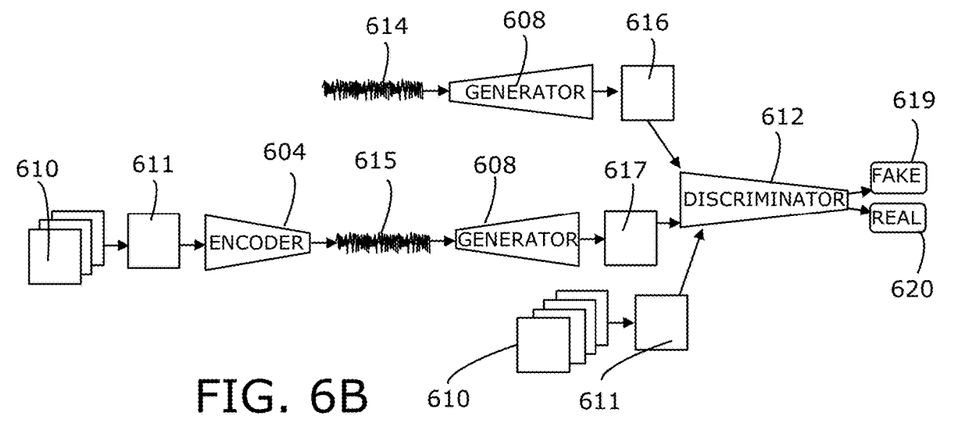
FIG. 6B depicts an example training process of the generator and encoder parts from the generating diagram in FIG. 6A, in accordance with various embodiments of the present disclosure.

FIG. 6B an example of the training process: A real skin crop 611 from among a plurality of skin crops 610 is processed by encoding network 604 to generate skin representation 615. Generator 608 processed random noise vectors 614 and latent skin representation 615 to obtain the random generated skin image 616 and a reconstructed skin crop 617. That is, generator 608 may reconstruct or generate images from a representation in the latent space or from a random representation in the latent space such that the images are similar to initial cropped images. Discriminator network 612 (i.e., trained to separate synthetic and real-skin images) comprising images 616, 617 (e.g., generated images) and a real skin crop 611 from subset 610 to divide then into group 619 including every non real skin crops included reconstructed 617 and randomly generated 616 and group of real skin crop's 620 included all subset from 610. That is, the discriminator network 612 may compare and separate fake images or crops (at least one of reconstructed or generated) from real images or crops, which may assist generator 608 to reproduce and generate images with greater accuracy.

Figure 7:
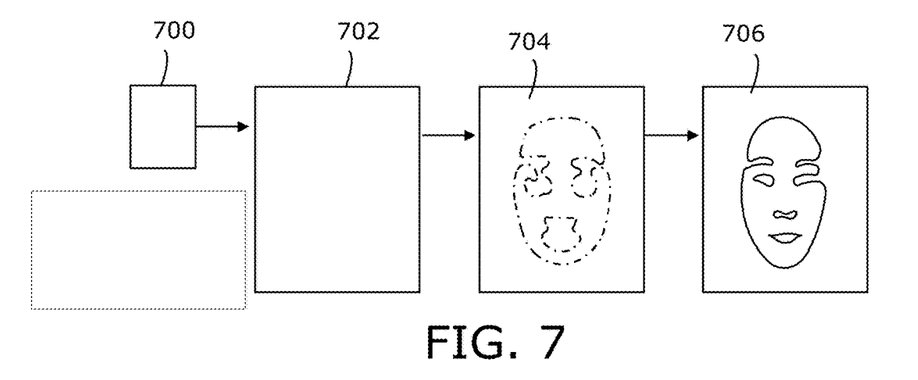
FIG. 7 depicts a systematic process flow diagram of generating an anonymized skin atlas from photo realistic skin patterns, in accordance with various embodiments of the present disclosure.

FIG. 7 depicts a systematic process flow diagram of generating an anonymized skin atlas from photo realistic skin patterns, in accordance with various embodiments. The skin crops 700 comprising photo realistic skin patterns are subjected to sampling to generate a skin pattern 702 with an initial photo shape. The skin pattern 702 is subjected to frequency domain equalization transform 704 to go through the corners of the skin mask, where the skin part of face is concatenated with the generated skin patterns, and smoothly changes a frequency response of skin pattern to softly cover sharp concatenation points to generate an anonymized facial skin atlas 706.

Figure 8A:
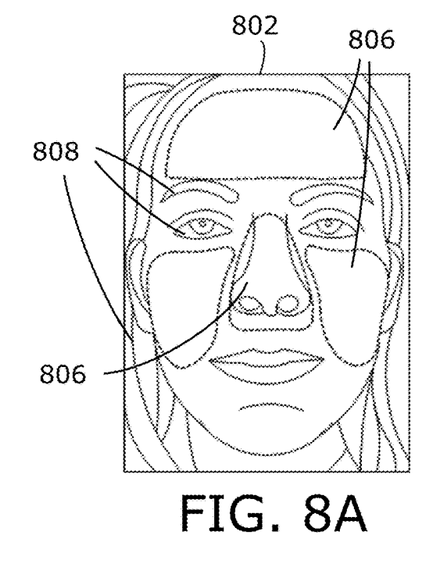
FIG. 8A and FIG. 8B depict exemplary facial images converted into anonymized facial images using the method and system of the present disclosure, in accordance with various embodiments of the present disclosure.
Figure 8B:
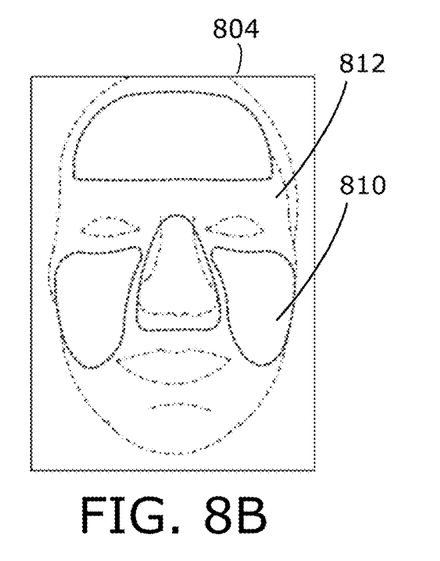

Figures FIG. 8A and FIG. 8B depict exemplary standardized facial images converted into anonymized facial images using the method and system of the present disclosure, in accordance with various embodiments. As depicted in FIG. 8A and FIG. 8B, an exemplary standardized facial image 802 comprising areas comprising skin-pixels 806 (i.e., forehead, nose, cheeks) and areas comprising pixels related to non-skin information 808 (i.e., eyebrows, eyes, hair) is converted into an anonymized facial image 804 shown in FIG. 8B, wherein areas comprising skin-pixels 806 and areas comprising pixels related to non-skin information 808 of the standardized facial image 802 are separated. In FIG. 8B a masked facial image 812 is concatenated with synthetic photo-realistic skin patterns 810.

Figure 9:
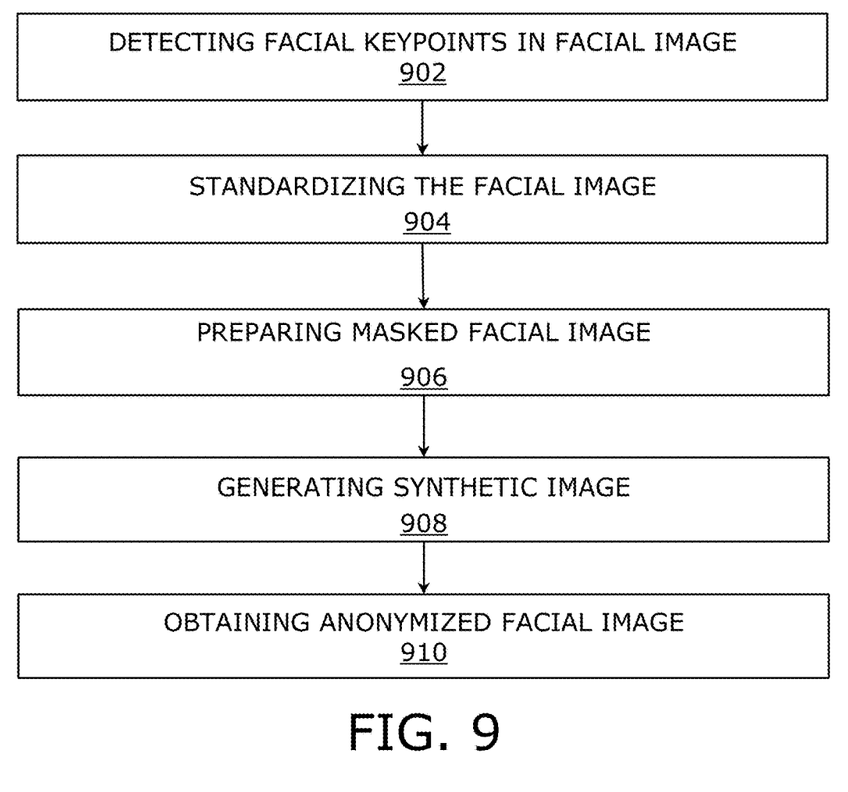
FIG. 9 illustrate a flowchart listing steps involved in a method for anonymizing a facial image, in accordance with various embodiments of the present disclosure.

FIG. 9A illustrates a flowchart listing steps involved in a method for anonymizing a facial image, in accordance with various embodiments of the present disclosure. At step 902, one or more sets of facial keypoints are detected in the facial image. At step 904, the facial image is standardized. At step 906, a masked facial image is prepared by separating one or more areas comprising skin-pixels and one or more areas comprising pixels related to non-skin information. At step 908, a synthetic image comprising photo-realistic skin patterns is generated. At step 910, an anonymized facial image is obtained by concatenating the masked facial image with generated photo-realistic skin patterns.

Where used throughout the specification and claims, "at least one of A or B" includes A only, B only, or A and B. It has to be noted that all devices, modules, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method for anonymizing a facial image, the method comprising:
   detecting one or more sets of facial keypoints in the facial image;
   standardizing the facial image;
   preparing a masked facial image by separating one or more areas comprising skin-pixels and one or more areas comprising pixels related to non-skin information, the masked facial image including the skin-pixels without the pixels related to the non-skin information;
   generating a synthetic image comprising photo-realistic skin patterns; and
   obtaining an anonymized facial image by concatenating the masked facial image with the generated photo-realistic skin patterns to fill the separated one or more areas comprising pixels related to non-skin information with the generated photo-realistic skin patterns.

2. The method according to claim 1, wherein detecting the one or more sets of facial keypoints is performed by using one or more pre-trained neural network models and one or more three-dimensional facial alignment models.

3. The method according to claim 1, wherein standardizing the facial image comprises at least one of: correcting a color distribution and a tone, cropping a surrounding area of a face in the facial image, correcting a rotation of the face in the facial image, correcting a position of the face relative to the facial image, or correcting a resolution of the facial image.

4. The method according to claim 1, wherein standardizing the facial images further comprises correcting an illumination by detecting, with a color clustering algorithm, a color area in at least one detected facial keypoint of the sets of facial keypoints based on at least one of a color palette or a laboratory color chip.

5. The method according to claim 1, wherein separating the one or more areas comprising skin-pixels and the one or more areas comprising pixels related to non-skin information is performed by at least one of: evaluation of color dependencies and distributions in the facial image, or by a convolutional neural network configured to segment the skin-pixels.

6. The method according to claim 5, wherein the convolutional neural network is trained on at least one phenotype dataset comprising images representing skin areas.

7. The method according to claim 1, wherein the separating is performed by using segmentation constructed on the detected one or more sets of facial keypoints, morphology segmentation, or gabor filtering-based segmentation.

8. The method according to claim 1, wherein generating the photo-realistic skin patterns comprises performing skin image compression to a latent space representation by one or more neural networks or by dimension reduction computational methods.

9. The method according to claim 8, wherein performing the skin image compression to the latent space representation further comprises performing a search for photo-realistic skin pattern-related dimensions by the one or more neural networks or by a computational method selected from at least one of unsupervised machine learning methods comprising clusterization, unsupervised neural networks, principal component analysis, independent component analysis, or singular value decomposition.

10. The method according to claim 1, wherein generating the synthetic image comprising the photo-realistic skin patterns is performed by using a computational method including at least one of a generative neural network or an inpainting algorithm.

11. The method according to claim 1, wherein the concatenating comprises combining the masked facial image with the synthetic image by one or more computational methods for filling one or more areas on the masked facial image comprising pixels related to non-skin information with generated photo-realistic skin patterns from the synthetic image.

12. The method according to claim 11, wherein the concatenating further comprises performing edge-effect reduction between areas from the masked facial image and areas from the synthetic image on the anonymized facial image by one or more computational methods.

13. A system for anonymizing a facial image, the system comprising:
    a memory configured to store a set of modules for anonymizing the facial image; and
    a processor configured to execute the set of modules, the set of modules including:
        a detection module configured to detect one or more sets of facial keypoints in the facial image,
        a standardization module configured to standardize the facial image,
        a segmentation module configured to separate one or more areas comprising non-skin pixels from the facial image for preparing a masked facial image that includes skin-pixels of the facial image without the non-skin pixels,
        a skin pattern generation module configured to generate a synthetic image with photo-realistic skin patterns, and
        an anonymization module configured to concatenate the masked facial image with the generated photo-realistic skin patterns for filling the separated one or more areas comprising non-skin pixels with the generated photo-realistic skin patterns.

14. The system according to claim 13, wherein the system further comprises one or more application programming interfaces configured to execute a collection of facial images to be analyzed, and to execute an analysis of the anonymized facial images.

15. The system according to claim 13, wherein the detection module is configured to detect the one or more sets of facial keypoints by using one or more pre-trained neural network models and one or more three-dimensional facial alignment models.

16. The system according to claim 13, wherein the standardization module is configured to standardize the facial image by at least one of: correcting a color distribution and a tone, cropping a surrounding area of a face in the facial image, correcting a rotation of the face in the facial image, correcting a position of the face relative to the facial image, or correcting a resolution of the facial image.

17. The system according to claim 13, wherein the standardization module is configured to standardize the facial image by correcting an illumination by detecting, with a color clustering algorithm, a color area in at least one detected facial keypoint of the sets of facial keypoints, the illumination correction being from applied from at least one of a color palette or a laboratory color chip.

18. The system according to claim 13, wherein the segmentation module is configured to separate the one or more areas comprising non-skin pixels from the facial image by at least one of: evaluation of color dependencies and distributions in the facial image, or by a convolutional neural network configured to segment the skin-pixels.

19. The system according to claim 18, wherein the convolutional neural network is trained on at least one phenotype dataset comprising images representing skin areas.

20. The system according to claim 13, wherein the segmentation module is configured to separate the one or more areas comprising non-skin pixels from the facial image by using segmentation constructed on the detected one or more sets of facial keypoints, morphology segmentation, or gabor filtering-based segmentation.

* * * * *